US008934471B2

(12) United States Patent
Yang et al.

(10) Patent No.: US 8,934,471 B2
(45) Date of Patent: Jan. 13, 2015

(54) METHODS AND DEVICES FOR IMPLEMENTING SYNCHRONOUS UPLINK HARQ PROCESS IN MULTIPLE BS COORDINATED RECEIVING NETWORKS

(75) Inventors: Tao Yang, Shanghai (CN); Mingli You, Shanghai (CN); Xudong Zhu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 91 days.

(21) Appl. No.: 13/257,039

(22) PCT Filed: Mar. 15, 2010

(86) PCT No.: PCT/CN2010/071038
§ 371 (c)(1),
(2), (4) Date: Sep. 16, 2011

(87) PCT Pub. No.: WO2010/105539
PCT Pub. Date: Sep. 23, 2010

(65) Prior Publication Data
US 2012/0014315 A1 Jan. 19, 2012

(30) Foreign Application Priority Data
Mar. 16, 2009 (CN) .......................... 2009 1 0047717

(51) Int. Cl.
H04J 3/06 (2006.01)
H04W 4/00 (2009.01)
H04L 1/18 (2006.01)
H04L 1/00 (2006.01)

(52) U.S. Cl.
CPC ............ *H04L 1/1854* (2013.01); *H04L 1/1812* (2013.01); *H04L 2001/0092* (2013.01)
USPC ......................................... 370/350; 370/328

(58) Field of Classification Search
USPC ......... 370/216, 280–281, 315, 328, 329, 394, 370/331–334, 350, 337, 347, 428, 429, 442, 370/503, 510, 517–519; 455/18, 524, 525, 455/132–135, 137, 138
See application file for complete search history.

(56) References Cited

U.S. PATENT DOCUMENTS

| 7,869,421 B2 * | 1/2011 | Rangan et al. ................. 370/350 |
| 8,619,706 B2 * | 12/2013 | Kalhan .......................... 370/331 |
| 2010/0074202 A1 * | 3/2010 | Park et al. ..................... 370/329 |
| 2012/0120927 A1 * | 5/2012 | Bucknell ....................... 370/336 |

FOREIGN PATENT DOCUMENTS

| CN | 1849768 A | 10/2006 |
| CN | 101018133 A | 8/2007 |

(Continued)

OTHER PUBLICATIONS
International Search Report for PCT/CN2010/071038 dated May 6, 2010.

*Primary Examiner* — Hanh N Nguyen
(74) *Attorney, Agent, or Firm* — Fay Sharpe LLP

(57) ABSTRACT

The invention provides methods for implementing synchronous uplink HARQ process in multiple BS coordinated receiving network. According to one embodiment, for synchronous uplink HARQ process with a relatively short response time limit, the service BS provides a receiving response in accordance with the response time limit, and formally instructs the terminal to retransmit or start a new transmission after the merging is completed. According to another embodiment, the synchronous uplink HARQ process has a response time limit matching the delay of multiple BS Coordinated network, and thus the service BS can transmit receiving response or control signaling on PDCCH after the mergence is completed. Thereby, the synchronous uplink HARQ process in multiple BS Coordinated networks of LTE and LTEA can be implemented.

15 Claims, 9 Drawing Sheets

(56) References Cited

FOREIGN PATENT DOCUMENTS

| | | |
|---|---|---|
| CN | 101132260 A | 2/2008 |
| CN | 101286792 A | 10/2008 |
| CN | 101364826 A | 2/2009 |
| CN | 101373998 A | 2/2009 |
| EP | 2061175 A1 | 5/2009 |
| EP | 2139242 A1 | 12/2009 |
| WO | WO2008123161 A1 | 10/2008 |

* cited by examiner

METHODS AND DEVICES FOR IMPLEMENTING SYNCHRONOUS UPLINK HARQ PROCESS IN MULTIPLE BS COORDINATED RECEIVING NETWORKS

TECHNICAL FIELD

The invention relates to the multiple BS coordinated receiving network, particularly relates to the method and device used for implementing the uplink HARQ process in multiple BS coordinated receiving network.

BACKGROUND OF THE ARTS

In the 3GPP Long Term Evolution (LTE) network and the further evolution of 3GPP Long Term Evolution (LTE-Advanced, LTEA) network, CoMP (Coordinated multiple point transmission and reception) is a very competitive option for improving the performance of the system.

Wherein, in the uplink inter-cell CoMP (also called as multiple BS coordinated receiving in the present specification), the core idea is: for a mobile terminal, the system determines a service BS and at least one assistant BS, the uplink signal sent by the mobile terminal will be received by the service BS and each assistant BS, then, the assistant BS forwards the uplink signal to the service BS, and the service BS merges the signal received directly by itself with the signals forwarded by the assistant BS, thus getting the mergence gain, which helps to improve the success rate of the signal reception and reduce the number of retransmissions.

FIG. 1 shows a typical multiple BS coordinated receiving network, wherein the BS 10 is the service BS for the mobile terminal 20, two adjacent BSs 11 and 12 of the BS 10 are assistant BSs. Of course, for other mobile terminals, the status of the three BSs may change, or other BSs may play the role of service BS or assistant BS.

Wherein, the assistant BS 11 and 12 forward the signals sent by mobile terminals through the wired backhaul link (eg, X2 interface) to the service BS 10. Wherein, the delay of the backhaul link is quite substantial, usually up to or even higher than 10 milliseconds (ms).

FIG. 2 shows the synchronous uplink HARQ process in the LTE standard, wherein, after a mobile terminal sends the uplink data, the waiting time is generally 4 ms, i.e., in FIG. 2, after sending the uplink service data of the uplink HARQ process 1 in sub-frame 4, it needs to receive the response in sub-frame 8, and, if the mobile terminal neither receives in the sub-frame 8 an ACK message which presents successful receiving, nor an NACK message which presents failed receiving, the mobile terminal will treat the uplink signal sent previously has not been correctly received by the receiver, therefore, will retransmit it later.

However, due to the multiple BS coordinated receiving network, the total delay produced by forwarding signals between BSs and merging signals is up to more than 10 milliseconds, which is contradictory to the response time limit of synchronous uplink HARQ process with the LTE standard.

In LTEA standard, it is not defined yet if the uplink HARQ process follows the proposal of LTE, wherein, if the LTEA standard using the same synchronous uplink HARQ technology with the LTE, then the technical problems will be the same with LTE, on the contrary, for LTEA people also need to provide an available proposal compatible with multiple BS coordinated receiving and synchronous uplink HARQ.

SUMMARY OF THE INVENTION

To address the above problems in the prior art, the invention proposes a solution, in the case in which service BS can finishes signal mergence only after the receiving response time limit of the synchronous uplink HARQ process expires, in order to implement synchronous uplink HARQ process in such multiple BS coordinated receiving network, the service BS always sends a delaying indication information to the mobile terminal in the response time limit after the sending of a uplink signal, regardless of whether the assistant BS sends the forwarded signal and whether the signal mergence has been completed, and regardless of whether the service BS itself has successfully received the uplink signal sent by the mobile terminal directly. The delaying indication information is used for indicating the mobile terminal to delay the sending of the follow-up signal for the uplink HARQ process. The mobile terminal will wait for the follow-up indication from the service BS, after receiving the delaying indication information, and does not send the uplink signal for the HARQ process before it receives the follow-up indication. After the mergence of signals finished, the service BS sends a new indication for the mobile terminal based on the result of the merging: to retransmit or to start a new initial transmission.

Preferably, the service BS allocates to other mobile terminals the wireless resource released due to the delaying, in the mobile terminal, of the sending of uplink signal, or allocates to that mobile terminal for other uses, in order to improve the resource utilization.

Specifically, according to one aspect of the present invention, it is provided a method used for implementing the synchronous uplink HARQ process in the service BS of multiple BS coordinated receiving network, wherein, the service BS finishes the mergence of signals after the response time limit of the synchronous uplink HARQ process expires. The method comprises the following steps: a. receiving a first uplink signal sent by a mobile terminal for the synchronous uplink HARQ process; b. sending a delay indication information for the mobile terminal before the response time limit of the synchronous uplink HARQ process expires, the information indicating to delay the sending of the follow-up uplink signal for the synchronous uplink HARQ process; the method further comprises: i. receiving forwarded signals forwarded by at least one assistant BS after they receive the first uplink signals; ii. merging the received first uplink signal with the forwarded signal, and indicating the mobile terminal to send the follow-up uplink signal for the synchronous uplink HARQ process, based on the result of the merging.

According to another aspect of present invention, it is provided a method used for implementing synchronous uplink HARQ process in the mobile terminals of multiple BS coordinated receiving network, wherein, the service BS completes the signal mergence after the response time limit of synchronous uplink HARQ process expires, the method comprises the following steps: A. sending a uplink signal for the synchronous uplink HARQ process, and buffering the data of the uplink signal; B. receiving a delay indicating information from the service BS before the response time limit of the synchronous uplink HARQ process expires, the information indicating to delay the sending of the follow-up uplink signal for the synchronous uplink HARQ process; C. delaying the sending of the follow-up uplink signal for the synchronous uplink HARQ process, and waiting for an indicating information from the service BS; D. receiving the indicating information from the service BS; E. sending the follow-up uplink signal for the synchronous uplink HARQ process, based on the indicating information.

According to still another aspect of present invention, it is provided a method used for implementing synchronous uplink HARQ process in the service BS of multiple BS coordinated receiving network, wherein, the synchronous uplink HARQ process has a response time limit matching the delay of multiple BS Coordinated network, the method comprises the following steps: m. receiving a uplink signal sent by a mobile terminal for a synchronous uplink HARQ process; further comprises: x. receiving forwarded signals forwarded by at least one assistant BS after they receive the uplink signal; after step m and x, further comprises:—merging the uplink signal with the forwarded signals; and—sending a receiving response for the synchronous uplink HARQ process to the mobile terminal, after the merging.

According to yet another aspect of present invention, it is provided a method used for implementing synchronous uplink HARQ process in the mobile terminals of multiple BS coordinated receiving network, wherein, the synchronous uplink HARQ process has a response time limit matching the delay of the multiple BS coordinated receiving network, the method comprises the following steps: O. sending a uplink signal for the synchronous uplink HARQ process, and buffering the data of the uplink signal; P. delaying the sending of the follow-up uplink signal for the synchronous uplink HARQ process, and waiting for an indicating information from the service BS; R. receiving the indicating information from the service BS; S. sending the follow-up uplink signal for the synchronous uplink HARQ process, based on the indicating information.

In addition, in order to implement the synchronous uplink HARQ process in multiple BS coordinated receiving network, after the service BS received the uplink signal from mobile terminal, the service BS does not return the receiving response to mobile terminal, but waits for the completion of signal mergence, and sends the receiving response to mobile terminal for the uplink HARQ process, after signal mergence completes.

Preferably, the service BS re-allocates the wireless resource released due to the delaying, in the mobile terminals, of the sending of uplink signals, in order to improve the resource utilization.

According to still another aspect of present invention, it is provided a first device used for implementing synchronous uplink HARQ process in the service BS of multiple BS coordinated receiving network, wherein, a service BS completes the signal mergence after the response time limit of the synchronous uplink HARQ process expires, the first device comprises: a first receiving means, used for receiving a first uplink signal sent by a mobile terminal for the synchronous uplink HARQ process; a first sending means, used for sending a delaying indication information to the mobile terminal before the response time limit of the synchronous uplink HARQ process expires, the information indicates to delay the sending of the follow-up uplink signal for the synchronous uplink HARQ process; a second receiving means, used for receiving forwarded signals forwarded by at least one assistant BS after they receive the first uplink signal; a merging processing means, used for merging the received first uplink signal with the forwarded signal, and indicating the mobile terminal to send the follow-up uplink signal for the synchronous uplink HARQ process, based on the result of the merging.

According to yet another aspect of present invention, it is provided a second device used for implementing synchronous uplink HARQ process in the mobile terminal of multiple BS coordinated receiving network, wherein, a service BS completes the signal mergence after the response time limit of the synchronous uplink HARQ process expires, the second device comprises: a first sending processing means, used for sending a uplink signal for the synchronous uplink HARQ process, and buffering the data of the uplink signal; a third receiving means, used for receiving a delay indicating information from the service BS before the response time limit of the synchronous uplink HARQ process expires, indicating to delay the sending of the follow-up uplink signal for the synchronous uplink HARQ process; a first delaying means, used for making the mobile terminal delay the sending of the follow-up uplink signal for the synchronous uplink HARQ process, and waiting for the indicating information from the service Basra forth receiving means, used for receiving the indicating information from the service BS; a second sending means, used for sending the follow-up uplink signal for the synchronous uplink HARQ process, based on the indicating information.

According to still another aspect of present invention, it is provided a third device used for implementing synchronous uplink HARQ process in the service BS of multiple BS coordinated receiving network, wherein, the synchronous uplink HARQ process has a response time limit matching the delay of multiple BS Coordinated network, the third device comprises: a fifth receiving means, used for receiving an uplink signal sent by a mobile terminal for a synchronous uplink HARQ process; a sixth receiving means, used for receiving forwarded signals forwarded by at least one assistant BS, after they receive the uplink signal; a merging means, used for merging the uplink signal with the forwarded signals; a third sending means, used for sending a receiving response for the synchronous uplink HARQ process to the mobile terminal, after the merging.

According to yet another aspect of present invention, it is provided a forth device used for implementing synchronous uplink HARQ process in mobile terminal of multiple BS coordinated receiving network, wherein, the synchronous uplink HARQ process has a response time limit matching the delay of multiple BS coordinated network, the forth device comprising:

A second sending processing means, used for sending an uplink signal for the synchronous uplink HARQ process, and buffering the data of the uplink signal;

A second delaying means, used for delaying the sending of the follow-up uplink signal for the synchronous uplink HARQ process, and waiting for an indicating information from the service BS;

A seventh receiving means, used for receiving the indicating information from the service BS;

A forth sending means, used for sending the follow-up uplink signal for the synchronous uplink HARQ process, based on the indicating information.

Using of the methods and devices provided by present invention, it is able to successfully implement the synchronous uplink HARQ process, in the case that there is a big delay in multiple BS coordinated receiving network, thereby, ensuring the backward compatibility of mobile terminals and improving the resource utilization and system performance.

BRIEF DESCRIPTION OF THE DRAWINGS

By reading the detailed description of the non-restrictive embodiments by referring to the figures, other features, purposes and advantages of the present invention will become more apparent.

By reading the detailed description of the non-restrictive embodiment in conjunction with the following figures, other purposes, features and advantages of the present invention will become more apparent. Wherein, the same or similar reference sign stands for the same or similar devices or procedure characteristics.

DETAILED EMBODIMENT OF THE INVENTION

The First Embodiment

Figure 1:
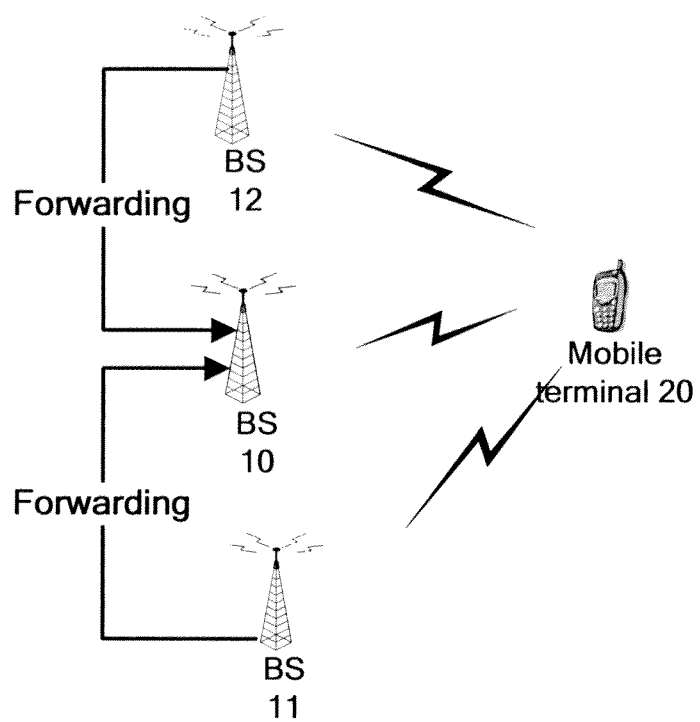
FIG. 1 shows a typical multiple BS coordinated receiving network.
Figure 3:
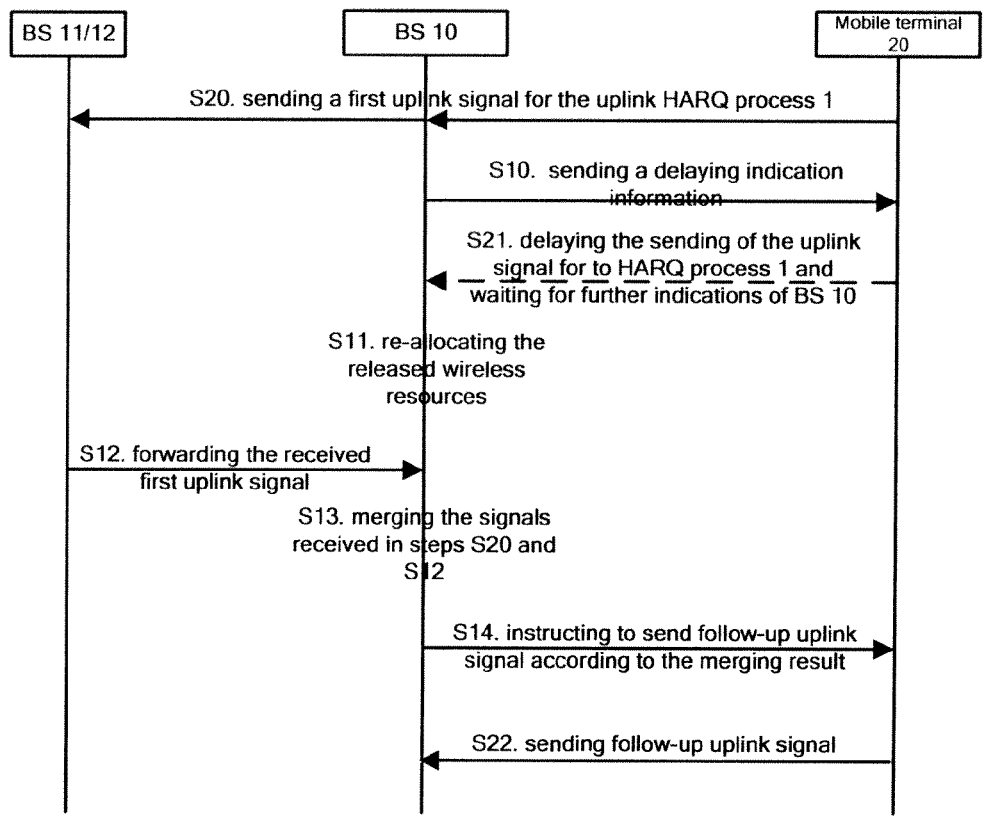
FIG. 3 shows the flow chart of the system method of implementing a synchronous uplink HARQ process in multiple BS coordinated receiving network, according to a first embodiment of present invention.

The method flow of the first embodiment according to the present invention will be introduced, from the system view point by referring to FIG. 3 in conjunction with FIG. 1. Wherein, FIG. 3 shows the flow chart of the system method of implementing a synchronous uplink HARQ process in multiple BS coordinated receiving network, according to the first embodiment of the present invention. Wherein, the total delay (eg. 10 ms) generated by service BS 10 (hereinafter referred to as BS 10), through receiving the forwarded signals based on the wired backhaul link between the BSs and merging, is greater than the response time limit (eg. 4 ms) of the uplink HARQ process of mobile terminal 1. That is, the BS 10 completes the signal mergence only after the response time limit expires. Without loss of generality, the network and the inside mobile terminal is based on 3GPP long-term evolution, or on further evolution of 3GPP Long Term Evolution.

Figure 4:
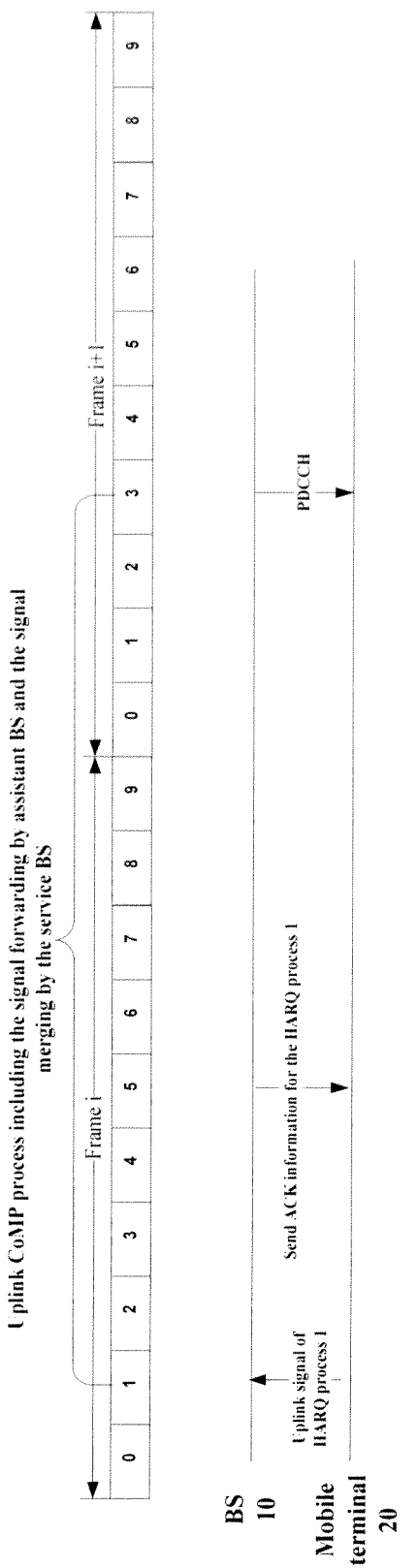
FIG. 4 is the signal flow diagram of implementing a synchronous uplink HARQ process in multiple BS coordinated receiving network, according to the first embodiment of present invention.

In order to better describe the process shown in FIG. 3, further refer to the signal flow diagram shown in FIG. 4, wherein the signal flow corresponds to the process in FIG. 3, and shows the frame i and the subsequent frame i+1, and each frame has 10 sub-frames. Wherein, the length of each sub-frame is 1 ms.

In the first embodiment, firstly, the mobile terminal 20 sends a first uplink signal for the synchronous uplink HARQ process 1 (referred to as HARQ process 1) in step 20, shown as the sub-frame 1 in FIG. 4.

Then, the BS 10, as well as the BSs 11 and 12 will receive the first uplink signal respectively. In order to perform the follow-up mergence, in step S12, the BSs 11 and 12 send the received first uplink signal to the BS 10 through the backhaul links between BSs. In the present case, the signal that received by the assistant BS from the mobile terminal and forwarded to a service BS is called as the forwarded signal.

Respectively in step S20 and step S12, the BS 10 will receive the first uplink signal sent by mobile terminal 20 directly, and the forwarded signal forwarded by BS 11, 12. In the following step S12, BS 10 merges these two parts of signals, and gets the result of the merging.

Those skilled in the art are able to understand, the signal forwarding processes generally start right after each BS receives the first uplink signal, however it is relatively time-consuming, and there is no strict time order between it and the following step S10, S21, S11 which will be discussed later. Preferably, step S10, S21, S11 are performed, during the signal forwarding process in the backhaul links between the BSs.

Figure 2:
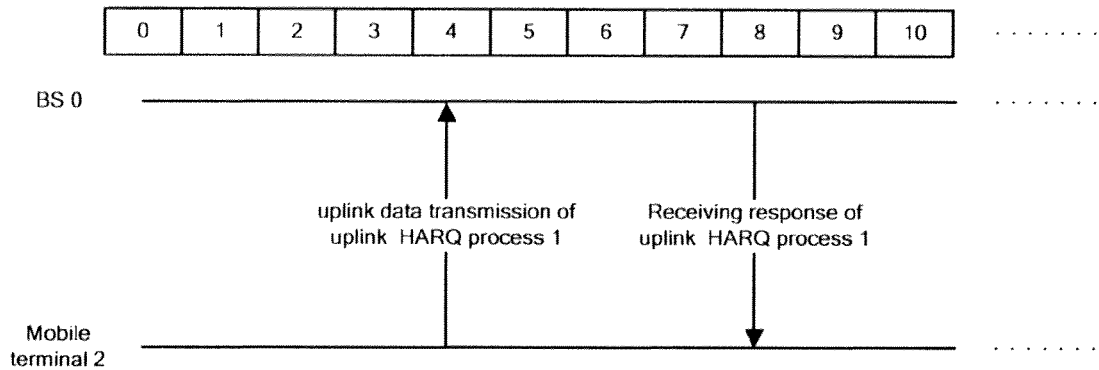
FIG. 2 shows the existing synchronous uplink HARQ process in LTE standard.

In the multiple BS coordinated receiving network, combining gains is able to improve the correct rate of the signal reception, thus BS 10 want to decrease the number of retransmission of mobile terminal 20 as much as possible. In order to achieve the backward-compatible of mobile terminals based on the existing standard, the multiple BS coordinated receiving shown in FIG. 4 is transparent to the terminals, in other words, the mobile terminal 20 has no awareness of the response time limit about synchronous uplink HARQ process between BS 11, 12 and BS 10 with respect to the LTE network shown in FIG. 2. If mobile terminal 20 cannot get the receiving response of BS 10 in sub-frame 5 of frame i, it considers that the BS does not receive the uplink signal sent in sub-frame 1 correctly, then it retransmits it in sub-frame 9. Obviously, this should be avoided.

With regard to this, in step S10, BS 10 sends to the mobile terminal 20 a delaying indication information, used for indicating mobile terminal 20 to delay the sending of the follow-up uplink signal for HARQ process 1. According to the first embodiment, after receiving this delay indicating information, mobile terminal 20 will not send follow-up uplink signal for HARQ process 1. In this embodiment, it should be understood that after mobile terminal 20 sends the first uplink signal in sub-frame 1 of frame i, the so-called follow-up uplink signals comprise the following situations: retransmission of data carried by the first uplink signal, uplink signals sent for the retransmission can be treated as a new first uplink signal; and, a new initial transmission performed after the first uplink signal is sent, the uplink signal sent for the new initial transmission can also be treated as a new first uplink signal.

Preferably, when mobile terminal 20 shown in FIG. 1 is based on 3GPP long term evaluation, the delay indicating information sent by BS 10 is ACK information. In 3GPP LTE standard, after receiving the ACK information, mobile terminal will wait for the controlling information sent by BS on PDCCH to perform the next uplink signal transmission.

Based on this, mobile terminal 20 will not sent the follow-up uplink signal for HARQ process 1 in sub-frame 9, but will wait for further indications of BS 10. Preferably, since the result of the merging of the first uplink signal and forwarded signal is not available yet in BS 10, after sending the first uplink signal in step S20 (corresponding to sub-frame 1 in frame i), mobile terminal 20 cannot make sure the mergence in BS 10 will be successful. Thus, after sending the first uplink signal, mobile terminal 20 buffers the data in the first uplink signal, thereby once the mergence in BS 10 is failed, mobile terminal 20 performs retransmission according to indication of BS 10.

Considering that the large delay brought by multiple BS coordinated receiving is quite considerable for synchronous uplink HARQ process under 3GPP LTE, as a result, after sending the first uplink signal, mobile terminal 20 usually waits for a while before being indicated for the next transmission, therefore, the wireless resources (such as, sub-frame), originally designated to be used by this mobile terminal 20 for transmitting the follow-up uplink signal, is then released. Preferably, in order to make a more sufficient use of these released wireless resources, the wireless resources in sub-frame 9 are re-allocated to other mobile terminals by BS 10. Those skilled in the art are able to understand, for avoiding disturbance caused by the re-allocation, the other mobile terminals will use different frequency resources as that of mobile terminal 20 when using the re-allocated sub-frame 9 to communicate with BS 10.

As mentioned above, since the delay of signal forwarding between the BSs is the maximum, therefore, step S10, S21 and S11 preferably work synchronously with the most time-consuming forwarding and signal mergence process. Thus, when the signal mergence in step S13 finally completes, the mobile terminal 20 has been waiting for the further indication from BS 10.

As shown in FIG. 4, BS 10 will send PDCCH indication information to mobile terminal 20 in sub-frame 3 of frame i+1, and the indication information conforms to the result of the merging of signals in step S13. Wherein, if the mergence is successful, it does not need mobile terminal 20 to retransmit, so the indication information indicates that the mobile terminal 20 can start a new initial transmission. Conversely, if the mergence fails, it preferably needs the mobile terminal 20 to retransmit. If the mobile terminal 20 has already buffered the data of the first uplink signal, then it could retransmit the data to BS 10, 11 and 12, based on the indication information. After that, basically, each process in FIG. 3 is re-performed, and unnecessary description will not be given.

The Second Embodiment

Figure 5:
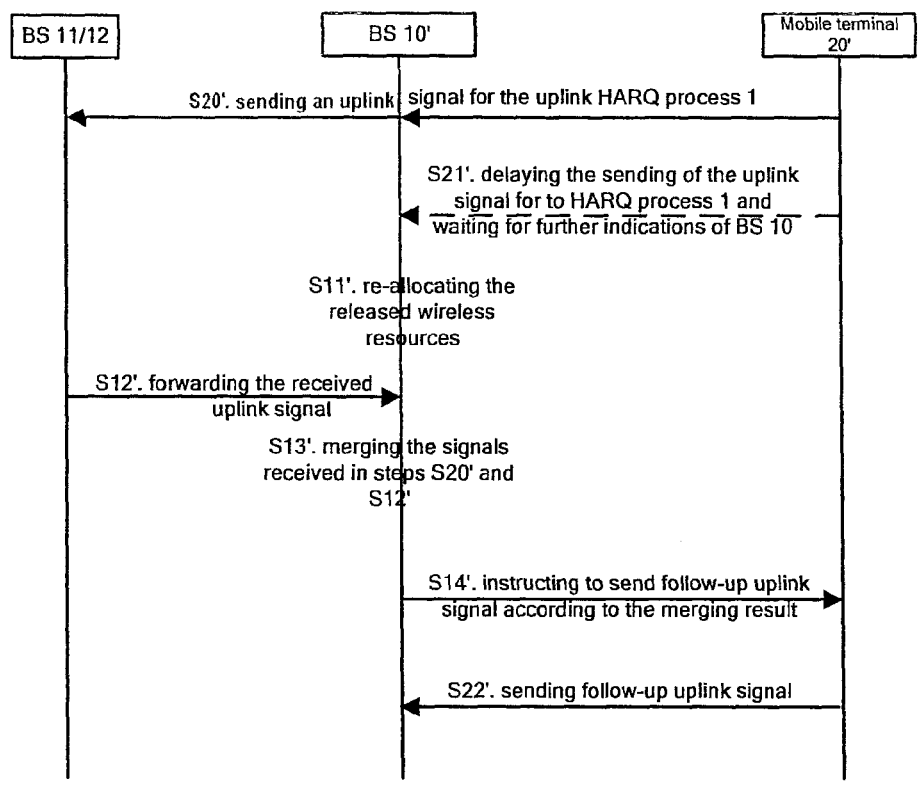
FIG. 5 shows the flow chart of the system method of implementing a synchronous uplink HARQ process in multiple BS coordinated receiving network, according to a second embodiment of present invention.

The method flow of the second embodiment according to present invention will be introduced, from the system view point by referring to FIG. 5 in conjunction with FIG. 1. Wherein, since the service BS and mobile terminal of the second embodiment are different from those in the first embodiment, they are respectively labeled as BS 10' and mobile terminal 20'.

FIG. 5 shows the flow chart of the system method of implementing a synchronous uplink HARQ process in multiple BS coordinated receiving network, according to the second embodiment of present invention. Without loss of generality, the network and the mobile terminal therein is based on further evolution of 3GPP Long Term Evolution, and the synchronous uplink HARQ process has a response time limit matching the delay of the multiple BS coordinated receiving network. After mobile terminal 20' sends an uplink signal, it will wait for an indication information sent from BS 10 based on the result of the merging, and then carry out pointed new initial transmission or retransmission.

Figure 6:
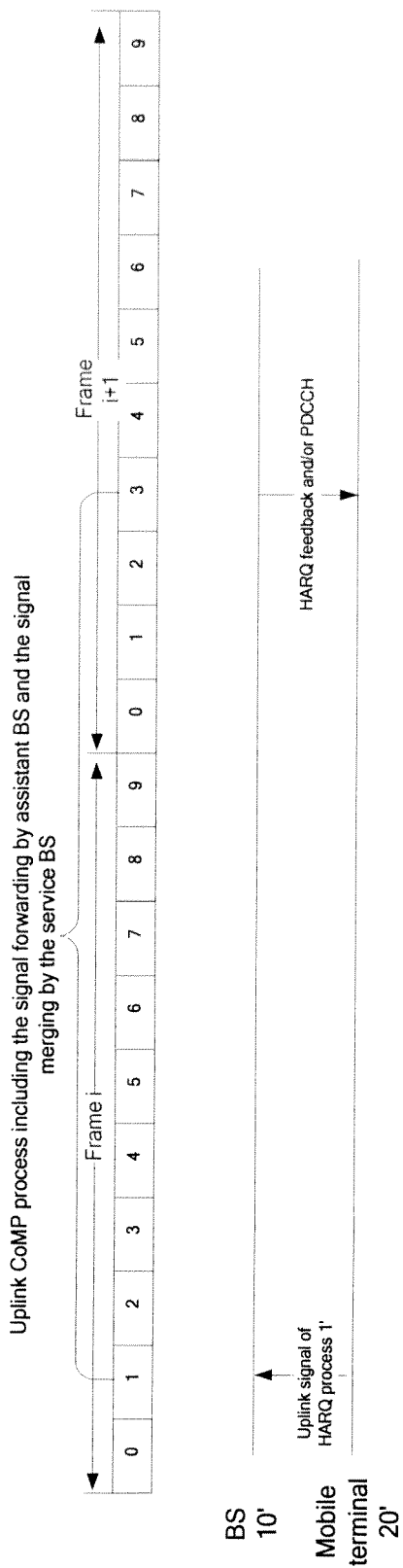
FIG. 6 is the signal flow diagram of implementing a synchronous uplink HARQ process in multiple BS coordinated receiving network, according to the second embodiment of present invention.

In order to better describe the process shown in FIG. 5, further refer to the signal flow diagram shown in FIG. 6, wherein the signal flow corresponds to the process in FIG. 5, and shows the frame i the frame i+1, and each frame has 10 sub-frames. Wherein, the length of each sub-frame is 1 ms.

In the second embodiment, firstly, mobile terminal 20' sends an uplink signal for the synchronous uplink HARQ process 1' (referred to as HARQ process 1') in step 20', shown as sub-frame 1 in FIG. 6.

Then, BS 10 and BS 11, 12 all receive the uplink signal. In order to perform the follow-up mergence, in step S12, BS 11, 12 send the received uplink signal to BS 10 through the wired backhaul links between BSs. In the present embodiment, the signal that received by the assistant BS from the mobile terminal and forwarded to a service BS is called as the forwarded signal.

Respectively in step S20' and step S12', the BS 10 will receive the uplink signal sent by mobile terminal 20 directly, and the forwarded signal forwarded by BS 11, 12. In the following step S13', BS 10 merges these two parts of signals, and gets the result of the merging.

In the second embodiment, HARQ process 1' has a response time limit matching the delay of the multiple BS coordinated receiving network, where BS 10, 11, 12 locate, one situation is: after mobile terminal 20 sends the uplink data in sub-frame 1 of frame i, it delays the sending of the follow-up uplink signal for HARQ process 1' without any indication from BS 10, until it receives the further indication from BS 10. Wherein, the follow-up signal in present case comprises the following situation: retransmission of the data carried by the uplink signal, the uplink signal sent for the retransmission can be treated as a new uplink signal; and a new initial transmission after sending the uplink signal, the uplink signal sent for the new initial retransmission can also be treated as a new uplink signal.

Similarly with the first embodiment, in order to adapt the large delay of the multiple BS coordinated receiving network, mobile terminal 20 releases the sub-frame 9 of frame i, which should be used for sending the uplink signal. Preferably, in order to improve the resource utilization, in step S11' BS 10 re-allocates this sub-frame to other mobile terminals.

Based on this, mobile terminal 20 will not send a follow-up signal for the HARQ process in sub-frame 9, but wait for the further indication from BS 10.

Preferably, since the result of the merging of first uplink signal and forwarded signal is not available yet in BS 10, after sending the first uplink signal in step S20' (corresponding to sub-frame 1 in frame i), mobile terminal 20 cannot make sure the mergence in BS 10 will be successful. Thus, after sending the first uplink signal, mobile terminal 20 buffers the data in first uplink signal, thereby once mergence in BS 10 is failed, mobile terminal 20 performs retransmission according to the indication of BS 10.

As shown in FIG. 6, in step S14', BS 10 will send HARQ feedback and/or PDCCH controlling signal for mobile terminal 20 in sub-frame 3 of frame i+1.

Wherein, when BS 10 only sends HARQ feedback, namely ACK information or NACK information to mobile terminal 20, it means the follow-up uplink signal sent by mobile terminal 20 still can use the wireless resources allocated before, especially the frequency resources. Mobile terminal 20 determines whether to start a new initial transmission or to retransmit the buffered data, according to the received information is ACK information or NACK information, and performs it in step S22';

When BS 10 only sends the controlling information of PDCCH to mobile terminal 20, the controlling information can inform mobile terminal 20 whether the reception of the first uplink signal sent in frame 1 is successful or failed, and give a new resource allocation, especially the frequency resources. Mobile terminal 20 will start a new initial transmission or retransmit in step S22', based on the controlling information;

When BS 10 sends HARQ feedback and the controlling signal of PDCCH to mobile terminal 20, mobile terminal 20 determines whether to start a new initial transmission or to retransmit the buffered data, according to the received information is ACK information or NACK information and according to the controlling information of PDCCH, while the wireless resources used for the transmission of the follow-up uplink signal follows the indication of the controlling information of PDCCH.

After introducing the method in details, the following text gives brief explanation about device parts with reference to the device block diagrams in conjunction with the abovementioned system method flow charts along with the signal flow charts.

First Embodiment

Figure 7:
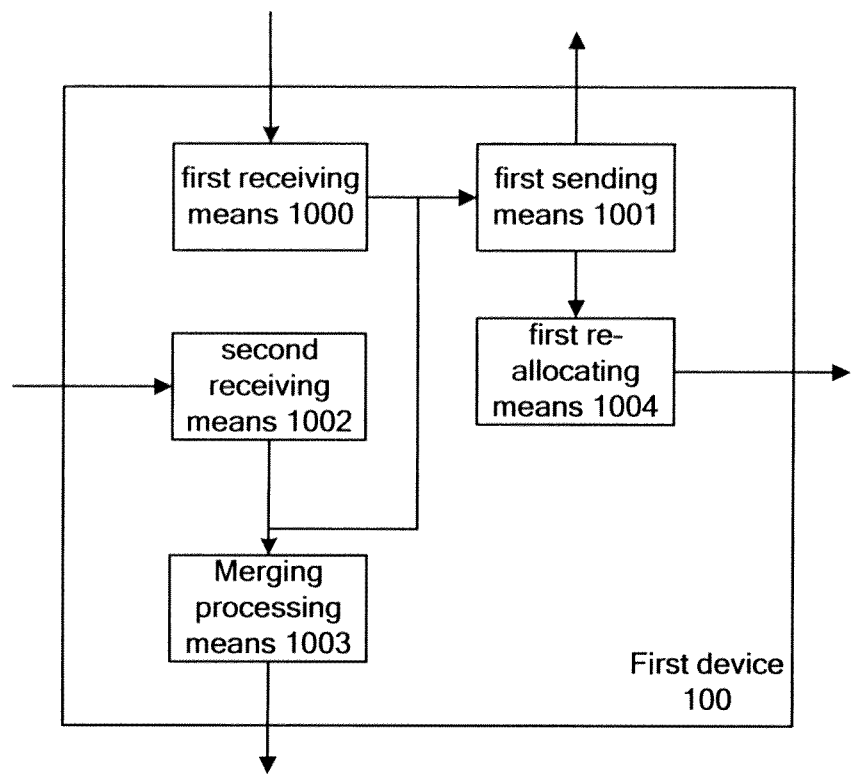
FIG. 7 shows the block diagram of the first device of implementing a synchronous uplink HARQ process in the BS of multiple BS coordinated receiving network, according to the first embodiment of present invention.
Figure 8:
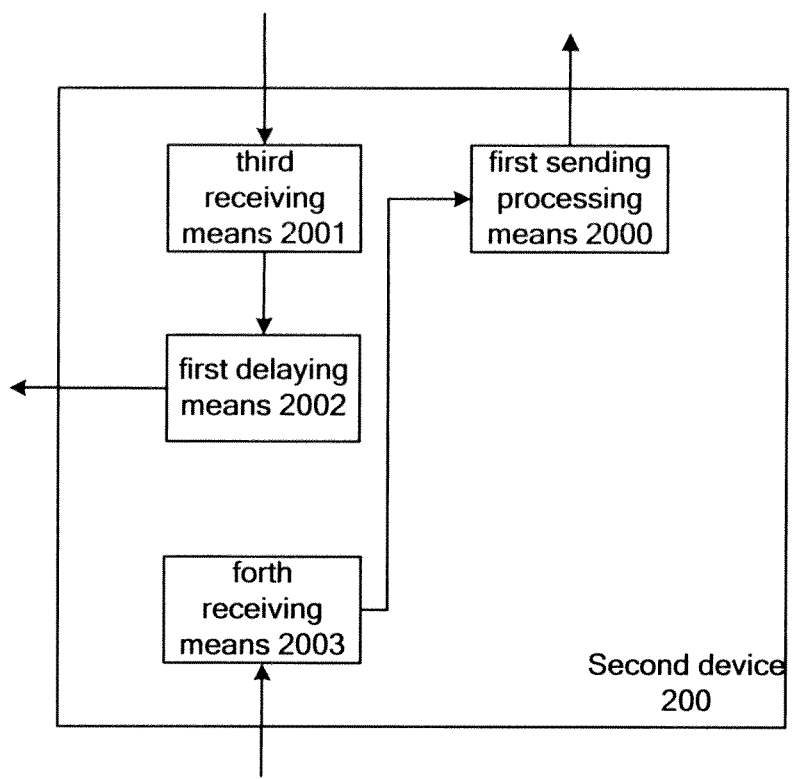
FIG. 8 shows the block diagram of the second device of implementing a synchronous uplink HARQ process in mobile terminals of multiple BS coordinated receiving network, according to the first embodiment of present invention.

FIG. 7 shows the block diagram of the first device of implementing a synchronous uplink HARQ process in the BS of multiple BS coordinated receiving network, according to the first embodiment of present invention. FIG. 8 shows the block diagram of the second device of implementing a synchronous uplink HARQ process in mobile terminals of multiple BS coordinated receiving network, according to the first embodiment of present invention.

The first sending processing means 2000 of the second device 200 in mobile terminal 20 performs the step S20 of FIG. 3, and buffers the sent data.

The first receiving means 1000 of the first device 100 in BS 10 receives the sent first uplink signal. Then, the first sending means 1001 sends a delay indication information to mobile terminal 20, for indicating mobile terminal 20 to delay the sending of the follow-up uplink signal for HARQ process 1.

The delay indication information is received by the third receiving means 2001 of mobile terminal 20, and delivered to the first delaying means 2002. The later makes the mobile terminal 20 delay the sending of the uplink signal for the HARQ process 1, according the delay indication information.

The first re-allocating means 1004 is responsible for re-allocating the wireless resources released due to above, eq., allocating to other mobile terminals.

Preferably, synchronously with the mentioned process, BS 11, 12 are forwarding the first uplink signal received to BS 10, the second receiving means 1002 is responsible for receiving of the forwarded signal and delivering it to the merging processing means 1003. Moreover, the first receiving means 1000 also delivers the received first uplink signal to the merging processing means 1003.

The merging processing means 1003 merges the signals sent from the first receiving means 1000 and the second receiving means 1002, and sends an indication for the follow-up uplink signal of mobile terminal 20 in the HARQ process 1, based on the result of the merging, namely performs step S14 in FIG. 3.

The fourth receiving means 2003 in mobile terminal 20 will receive the indication sent from the merging processing means 1003, and transfer it to the first sending processing means 2000. The later sends follow-up uplink signal according to indication of BS 10 concretely. Consequently, the second device 200 finished an operation process with the first device 100. After that each operation mentioned above only need to be repeated for a new first uplink signal, and unnecessary description will not be given.

Second Embodiment

Figure 9:
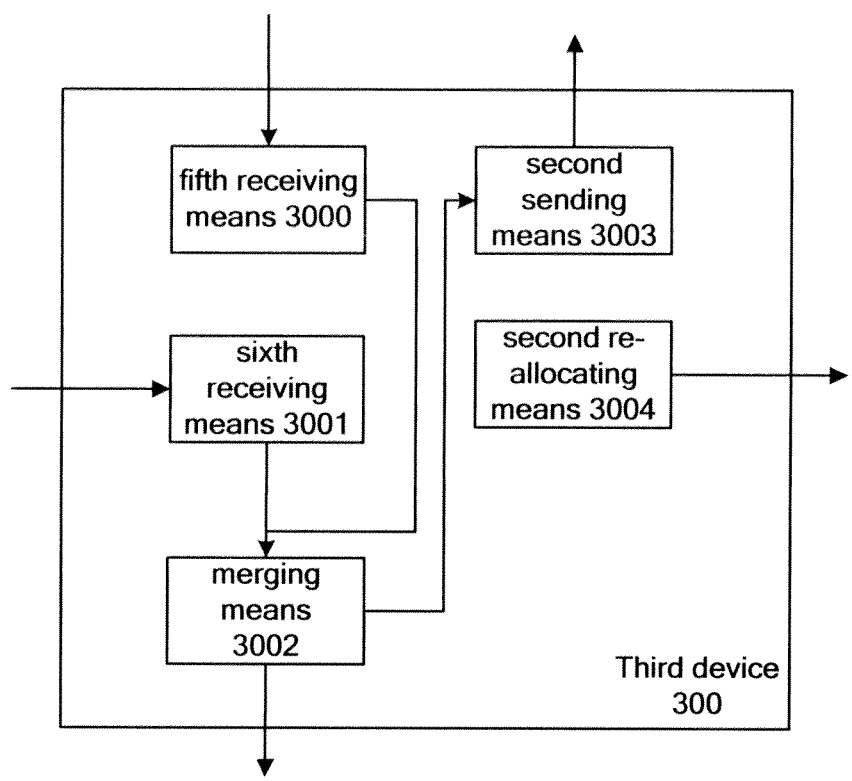
FIG. 9 shows the block diagram of the third device of implementing a synchronous uplink HARQ process in the BS of multiple BS coordinated receiving network, according to the second embodiment of present invention.
Figure 10:
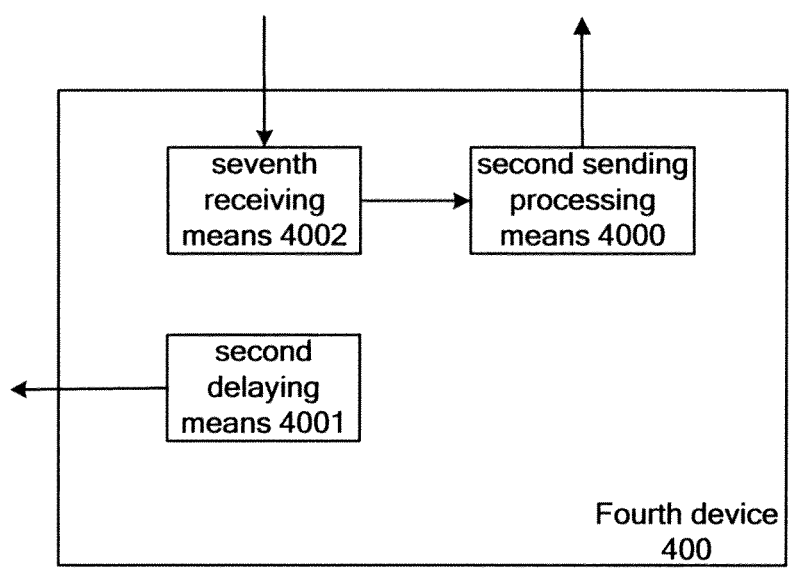
FIG. 10 shows the block diagram of the forth device of implementing a synchronous uplink HARQ process in mobile terminals of multiple BS coordinated receiving network, according to the second embodiment of present invention.

FIG. 9 shows the block diagram of the third device of implementing a synchronous uplink HARQ process in the BS of multiple BS coordinated receiving network, according to the second embodiment of the present invention. FIG. 10 shows the block diagram of the forth device of implementing a synchronous uplink HARQ process in mobile terminals of multiple BS coordinated receiving network, according to the second embodiment of the present invention. The following introduction about the third device 30 and the forth device 40 will refer to FIG. 5 and FIG. 6.

Firstly, the second sending processing means 4000 of mobile terminal 20 sends a second uplink signal, and the second uplink signal is received by BSs 10, 11 and 12. And it is forwarded by BSs 11 and 12 to BS 10.

The fifth receiving means 3000 of BS 10 receives the second uplink signal, and the sixth receiving means 3001 receives the forwarded signal sent by BSs 11 and 12. The signals received by both are provided for the merging means 3002, for performing the signal mergence.

The result of the merging got by the merging means 3002 is provided for the second sending means 3003, and the latter provides an indication of step S14' for mobile terminal 20, according to the result of the merging.

The seventh receiving means 4002 of mobile terminal 20 receives the indication information, and provides for the second sending processing means 4000, and the later performs retransmission or a new initial transmission, based on the indication information.

Wherein, after the second uplink signal is sent, the second delaying means 4001 make mobile terminal 20 delay the sending of follow-up uplink signal for HARQ process 1'.

Preferably, the second re-allocating means 3004 of BS 10 is responsible for re-allocating the wireless resources released due to the delaying, in mobile terminal 20, of the sending of the uplink signal in HARQ process 1 to other mobile terminals, to improve the resource utilization.

Above describes the embodiment of the present invention. What is needed to be noted is, the present invention is not limited to the specific embodiments mentioned above, and those skilled in the art is able to make various variation or modification within the scope of claims in appendix.

What is claimed is:

1. A method, operative in a service base station (BS) of a multiple BS coordinated receiving network, used for implementing a synchronous uplink HARQ process, wherein the service BS completes a signal merging process after a response time limit of said synchronous uplink HARQ process expires, said method comprising:

receiving a first uplink signal sent by a mobile terminal for the synchronous uplink HARQ process; and sending a delaying indication information to the mobile terminal before the response time limit of the synchronous uplink HARQ process expires, the delay information indicating to delay a sending of a follow-up uplink signal for the synchronous uplink HARQ process;

wherein said signal merging process includes:

receiving at least one forwarded signal forwarded by at least one assistant BS after receiving the first uplink signal; and merging the received first uplink signal with the forwarded signal; and wherein said method further comprises indicating to the mobile terminal to send the follow-up uplink signal for the synchronous uplink HARQ process, based on a result of said merging.

2. A method according to claim 1, wherein, said sending the delaying indication information comprises:
sending ACK information to the mobile terminal before the response time limit of the synchronous uplink HARQ process expires, in order to indicate to the mobile terminal to delay the sending of follow-up uplink signals for the synchronous uplink HARQ process.

3. A method according to claim 2, wherein, after said sending the delaying indication information, the method further comprises:
releasing at least one wireless resource due to a delay, in the mobile terminal, of the sending of the follow-up uplink signal for the synchronous uplink HARQ process; and
reallocating the at least one wireless resource released to another mobile terminal.

4. A method according to claim 1, wherein, said indicating comprises:
indicating to the mobile terminal to retransmit the first uplink signal, if the merging fails;
otherwise, indicating to the mobile terminal to start a new initial transmission.

5. A method according to claim 1, wherein, the mobile terminal is based on 3GPP long-term evolution, or on further evolution of 3GPP Long Term Evolution.

6. A method, operative in a mobile terminal of a multiple base station (BS) coordinated receiving network, used for implementing a synchronous uplink HARQ process, wherein, a service BS completes a signal merging process after a response time limit of the synchronous uplink HARQ process expires, the method comprising:
sending a first uplink signal for the synchronous uplink HARQ process, and buffering the data of the first uplink signal;
receiving a delay indicating information sent by the service BS before the response time limit of that synchronous uplink HARQ expires, the information indicating to delay a sending of a follow-up uplink signal for the synchronous uplink HARQ process;
delaying the sending of the follow-up uplink signal for the synchronous uplink HARQ process, and waiting for an indicating information from the service BS;
receiving the indicating information from the service BS; and
sending the follow-up uplink signal for the synchronous uplink HARQ process, based on the indicating information.

7. A method according to claim 6, wherein said sending the follow-up uplink signal comprises:
sending for the synchronous uplink HARQ process a retransmitted signal containing the buffered data when the indicating information indicates to the mobile terminal to retransmit.

8. A method according to claim 6, wherein, the mobile terminal is based on 3GPP long-term evolution, or on further evolution of 3GPP Long Term Evolution.

9. A method, operative in a service base station (BS) of a multiple BS coordinated receiving network, used for implementing a synchronous uplink HARQ process, wherein, the synchronous uplink HARQ process has a response time limit which would otherwise expire during a signal processing delay experienced in the multiple BS coordinated network, said method comprising:
receiving an uplink signal sent by a mobile terminal for a synchronous uplink HARQ process;
receiving at least one forwarded signal forwarded by at least one assistant BS after receiving the uplink signal;
merging the uplink signal with the at least one forwarded signal; and sending a receiving response for the synchronous uplink HARQ process to the mobile terminal, after the merging.

10. A method according to claim 9, wherein, the mobile terminal delays a sending of a follow-up uplink signal for the uplink HARQ process, and waits for an indicating information from the service BS, after sending the uplink signal, said method further comprising:
releasing a wireless resource due to the delay, in the mobile terminal, of the sending of the follow-up uplink signal for the synchronous uplink HARQ process; and
reallocating the wireless resource released.

11. A method according to claim 9, wherein, the receiving response comprises at least one of the following:
ACK or NACK information;
PDCCH controlling information.

12. A method according to claim 9, wherein, the mobile terminal is based on further evolution of 3GPP Long Term Evolution.

13. A method, operative in a mobile terminal of a multiple base station (BS) coordinated receiving network, used for implementing a synchronous uplink HARQ process, wherein, the synchronous uplink HARQ process has a response time limit which would otherwise expire during a signal processing delay experienced in the multiple BS coordinated receiving network, said method comprising:
sending an uplink signal for the synchronous uplink HARQ process, and buffering the data of the second uplink signal, wherein said uplink signal is received by a service BS and merged thereby with a forwarded signal forwarded to the service BS from at least one other assistant BS;
delaying a sending of a follow-up uplink signal for the synchronous uplink HARQ process, and waiting for indicating information from the service BS;
receiving the indicating information from the service BS, after the service BS has merged the uplink signal and the forwarded signal; and
sending the follow-up uplink signal for the synchronous uplink HARQ process, based on the indicating information.

14. A method according to claim 13, wherein, said sending the follow-up uplink signal comprises:
sending for the synchronous uplink HARQ process a retransmitted signal containing the buffered data, when the indicating information indicates to the mobile terminal to retransmit.

15. A method according to claim 13, wherein, the mobile terminal is based on further evolution of 3GPP Long Term Evolution.

* * * * *